(12) United States Patent
Kim

(10) Patent No.: US 10,240,828 B2
(45) Date of Patent: Mar. 26, 2019

(54) CONNECTION PIPE AND METHODS OF MANUFACTURING AND USING A CONNECTION PIPE FOR AN EVAPORATOR OF A REFRIGERATION DEVICE

(71) Applicant: Dongbu Daewoo Electronics Corporation, Seoul (KR)

(72) Inventor: Myeong Suck Kim, Bucheon-si (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 950 days.

(21) Appl. No.: 14/101,269

(22) Filed: Dec. 9, 2013

(65) Prior Publication Data

US 2015/0137512 A1 May 21, 2015

(30) Foreign Application Priority Data

Nov. 21, 2013 (KR) ........................ 10-2013-0142063

(51) Int. Cl.
*F25B 41/00* (2006.01)
*B21D 53/02* (2006.01)
(Continued)

(52) U.S. Cl.
CPC ............ *F25B 41/003* (2013.01); *B21D 53/02* (2013.01); *F16L 13/0236* (2013.01);
(Continued)

(58) Field of Classification Search
CPC ....... F16L 13/0236; F16L 9/006; F16L 11/14; F25B 41/003; F25B 39/02; F25B 2500/06;
(Continued)

(56) References Cited

U.S. PATENT DOCUMENTS 3,930,377 A * 1/1976 Utter ....................... F25C 5/002
138/177
5,339,868 A * 8/1994 Naoi ..................... F16L 43/001
138/177 X (Continued)

FOREIGN PATENT DOCUMENTS

| KR | 10-0860820 B1 | 9/2008 |
| KR | 10-2009-0128123 | 12/2009 |
| KR | 10-2011-0026844 A | 3/2011 |

OTHER PUBLICATIONS

Korean Patent Abstracts, Publication No. 10-2009-0128123, Published Dec. 15, 2009, KIPO, Republic of Korea.

*Primary Examiner* — Greg Binda
*Assistant Examiner* — Zachary T Dragicevich

(57) ABSTRACT

Embodiments of the present invention include a connection pipe and a method of manufacturing the connection pipe for an evaporator of a refrigeration device. In the connection pipe and method, high-frequency welding is performed while a first pipe is at one side of a tube and a second pipe is at another side of the tube are welded, and a first curvature portion is in the first pipe and a second curvature portion is in the second pipe. Even though the connection pipe according to embodiments of the present invention is forced or pressed to connect a suction pipe to the second pipe, the connection pipe may not be deformed or damaged due to a structural characteristic during installation of the evaporator in the refrigeration device.

5 Claims, 8 Drawing Sheets

(51) Int. Cl.
*F16L 13/02* (2006.01)
*F28F 9/26* (2006.01)
*B23K 13/01* (2006.01)
*F25B 39/02* (2006.01)
*B23K 101/06* (2006.01)
*B23K 101/14* (2006.01)
*B23K 103/10* (2006.01)
*B23K 103/12* (2006.01)
*B23K 103/18* (2006.01)

(52) U.S. Cl.
CPC ............. *F28F 9/268* (2013.01); *B23K 13/01* (2013.01); *B23K 2101/06* (2018.08); *B23K 2101/14* (2018.08); *B23K 2103/10* (2018.08); *B23K 2103/12* (2018.08); *B23K 2103/18* (2018.08); *F25B 39/02* (2013.01); *F25B 2500/01* (2013.01); *F25B 2500/06* (2013.01); *Y10T 29/49359* (2015.01); *Y10T 29/49428* (2015.01)

(58) Field of Classification Search
CPC   F25B 2500/01; B21D 53/02; Y10T 29/49428
USPC ...................... 285/288.1; 138/177, DIG. 11; 29/890.032, 890.053, 890.14
See application file for complete search history.

(56) References Cited

U.S. PATENT DOCUMENTS

| | | | | |
|---|---|---|---|---|
| 5,426,900 | A * | 6/1995 | Springer | .................. A47K 4/00 4/460 |
| 2006/0096314 | A1* | 5/2006 | Nakamura | ................ F16L 7/00 62/498 |
| 2011/0003261 | A1* | 1/2011 | Goss | |
| 2011/0123361 | A1* | 5/2011 | Byun | .................. F01C 21/0863 417/199.1 |
| 2012/0325363 | A1* | 12/2012 | Knebl | .................. B29C 53/083 138/177 |

\* cited by examiner

PRIOR ART

CONNECTION PIPE AND METHODS OF MANUFACTURING AND USING A CONNECTION PIPE FOR AN EVAPORATOR OF A REFRIGERATION DEVICE

CROSS-REFERENCE TO RELATED APPLICATIONS

This application is based on and claims priority from Korean Patent Application No. 10-2013-0142063, filed on Nov. 21, 2013, the disclosure of which is incorporated herein in its entirety by reference.

TECHNICAL FIELD

The present disclosure relates to a connection pipe and methods of and/or using the connection pipe for an evaporator of a refrigeration device, and more particularly, to a connection pipe and methods of manufacturing and/or using the connection pipe for an evaporator of a refrigeration device (e.g., a refrigerator) that can prevent the connection pipe from being deformed, and/or improve rigidity of the connection pipe when installing the evaporator. In the refrigeration device, the evaporator implements some or all of the function(s) in the refrigeration device, which has a refrigeration cycle that includes compression, condensation, expansion, and evaporation.

BACKGROUND

In general, it is known that a refrigeration device, such as a refrigerator, can store fresh products, low-temperature products, and the like at a low temperature. Refrigerant is used to maintain the low temperature. The refrigerant is circulated in a refrigeration cycle that includes compression, condensation, expansion, and evaporation.

The present disclosure relates to a connection pipe used when installing an evaporator in the refrigeration device.

In general, the evaporator is configured to include an accumulator. The connection pipe connects the accumulator and a suction pipe.

When the connection pipe is connected to the suction pipe, the suction pipe is pushed and/or inserted into the connection pipe. The connection pipe requires rigidity.

However, when the applied force is not appropriately controlled, a specific section of the connection pipe is bent or deformed in a predetermined direction, and may become damaged (e.g., partially or completely closed).

As described above, the connection pipe may be abnormally deformed, and the abnormal deformation adversely affects the circulation of the refrigerant. As a result, the connection pipe may require careful assembly at the time of manufacturing and/or installation of the refrigeration device. Accordingly, the manufacturing and/or installation yield may be lower than desired, a significant amount of time may be required to assemble the connection pipe, and as a result, productivity may decrease.

In general, a circulation process of refrigerant, an evaporator, and a suction pipe is disclosed in Korean Patent Laid-Open Publication No. 10-2009-0128123 (Dec. 15, 2009).

SUMMARY

The present disclosure has been made in an effort to provide a connection pipe and methods of manufacturing and/or using the connection pipe for an evaporator capable of preventing the connection pipe from becoming inappropriately bent, damaged, or deformed at the time of installation.

Embodiments of the present disclosure provide a connection pipe for an evaporator of a refrigeration device that including a first pipe 10 with a first curvature portion; a second pipe with a second curvature portion; and a tube connecting ends of the first pipe and the second pipe.

The first curvature portion has a first curvature angle (a) that may be larger than 90° and smaller than 180°, the second curvature portion has a second curvature angle (b) that may be smaller than 90°, and the second pipe has first and second ends that may be at an obtuse angle.

There may be a single first curvature portion and/or a single second curvature portion, and a curvature direction of the first curvature portion and a curvature direction of the second curvature portion may be opposite to each other (e.g., up versus down).

The first pipe may comprise or consist of aluminum, and the second pipe may comprise or consist of copper.

The first pipe and the second pipe may be connected to each other by high-frequency welding.

Embodiments of the present disclosure provide a method of manufacturing and/or using a connection pipe including inserting a first pipe and a second pipe into a tube to physically connect the first pipe and the second pipe; and forming a first curvature portion in the first pipe and a second curvature portion in the second pipe. As a result, multiple curvature portions may be formed in the connection pipe after the first step.

A first curvature angle a of the first curvature portion may be larger than 90° and smaller than 180°, a second curvature angle b of the second curvature portion may be smaller than 90°, and a first end of the second pipe and a second end of the second pipe may be at an obtuse angle.

There may be a single first curvature portion and/or a single second curvature portion, and a curvature direction of the first curvature portion and a curvature direction of the second curvature portion may be opposite to each other (e.g., up versus down).

In the first step, the first pipe, the second pipe, and the tube may be connected to each other by welding (e.g., high-frequency welding).

Other detailed matters of the exemplary embodiments are included in the detailed description and the drawings.

According to the connection pipe for an evaporator of a refrigeration device and methods of manufacturing and/or using the connection pipe according to the exemplary embodiments of the present disclosure, even though pressure is applied to the connection pipe to connect it to a suction pipe at the time of installation, deformation of the connection pipe may be prevented due to a structural characteristic of the connection pipe.

According to the connection pipe and method(s) of the present disclosure, the connection pipe does not require excessive care at the time of assembling. As a result, the assembly time may decrease the installation and/or manufacturing yield may increase, and productivity may improve.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
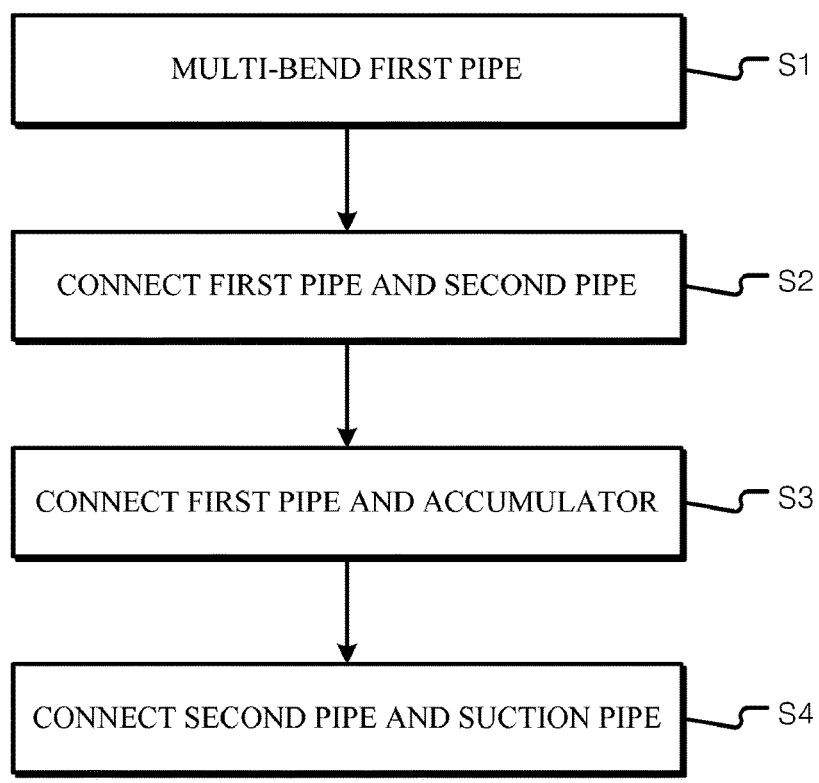
FIG. 1 is a diagram describing a manufacturing method of a connection pipe for an evaporator of a refrigeration device according to a comparative example.

In the following detailed description, reference is made to the accompanying drawings, which forms a part hereof. The illustrative embodiments described in the detailed description, drawings, and claims are not meant to be limiting. Other embodiments may be utilized, and other changes may be made, without departing from the spirit or scope of the subject matter presented here.

Hereinafter, one or more exemplary embodiments of the present disclosure will be described more fully with reference to the accompanying drawings. As those skilled in the art will realize, the described exemplary embodiments may be modified in various ways, all without departing from the spirit or scope of the present disclosure, which is not limited to exemplary embodiments described herein. However, in the description of the present disclosure, a detailed explanation and a detailed illustration of known functions and constitutions may be omitted when it unnecessarily obscures the subject matter of the present disclosure. The accompanying drawings may not be illustrated to an actual scale, and some components may be enlarged for easier understanding of the present disclosure.

Meanwhile, the terms used in the description are defined considering the functions in the present disclosure, and may vary depending on the intention or usual practice of a manufacturer. Therefore, the definitions should be based on the entire contents of the present specification.

Similar or like reference numerals indicate similar or like elements throughout the specification.

Hereinafter, a connection pipe and a manufacturing method of the connection pipe for an evaporator of a refrigeration device according to a comparative example will be described with reference to FIGS. 1 to 4.

Figure 2:
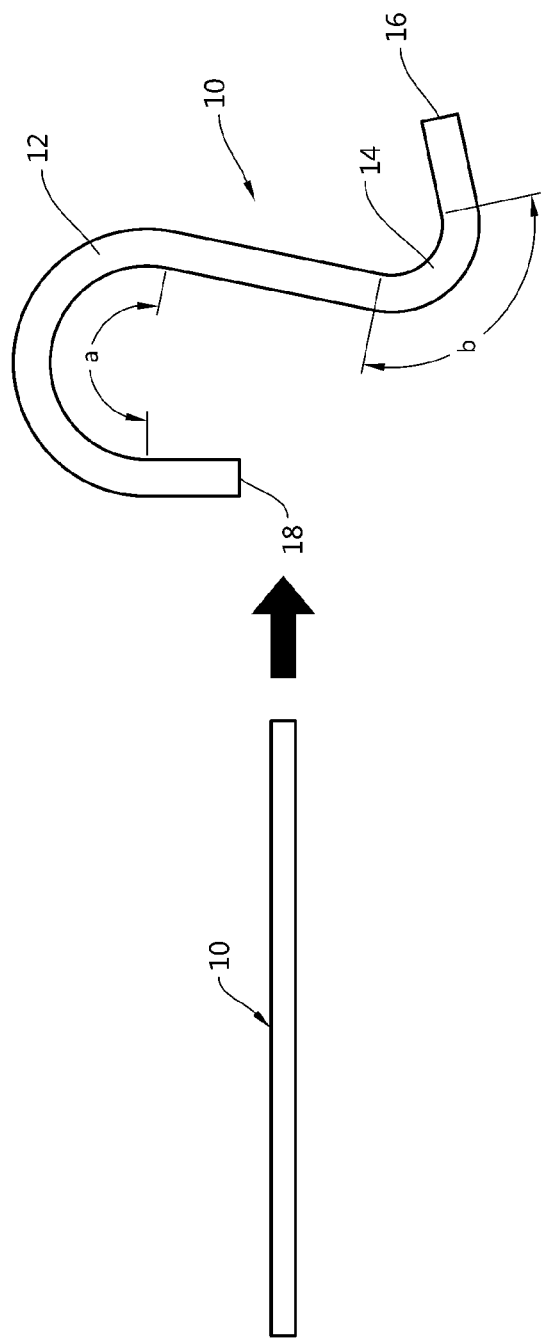
FIGS. 2 and 3 are diagrams describing a connection pipe and a manufacturing method of the connection pipe for an evaporator of a refrigeration device according to a comparative example.
Figure 3:
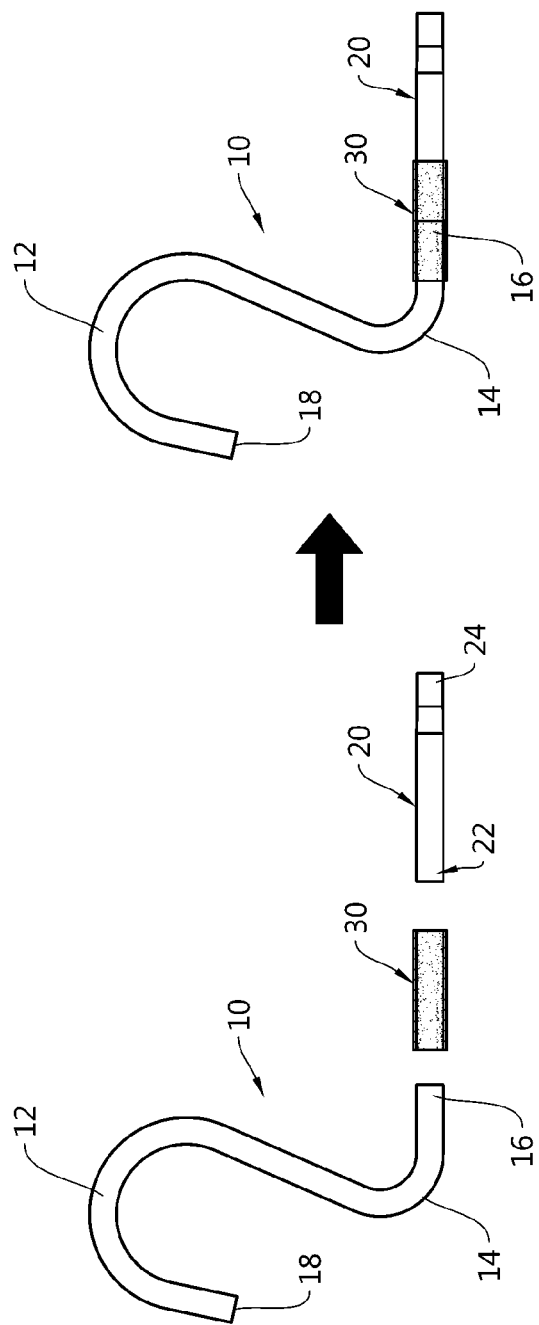
Figure 4:
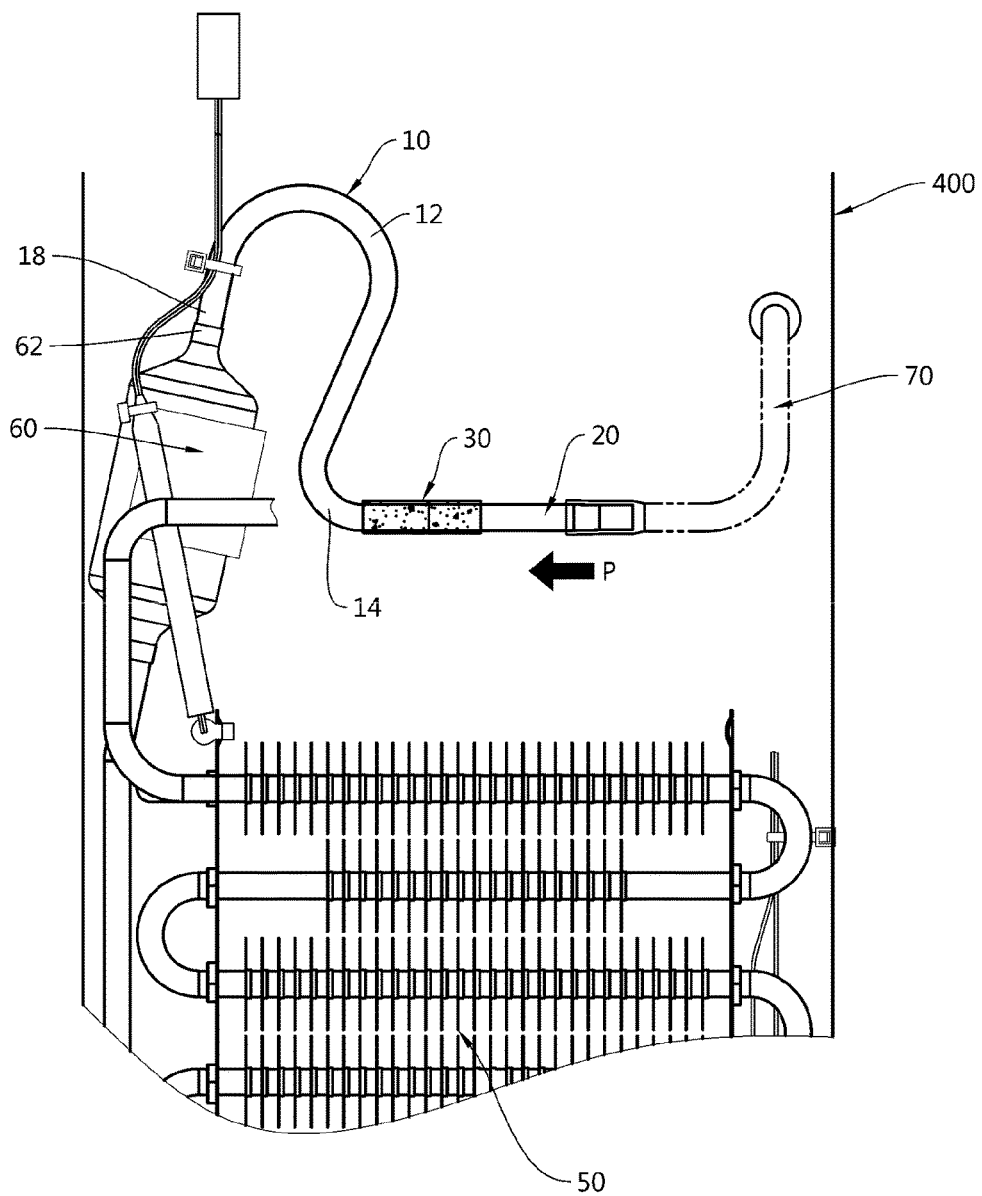
FIG. 4 is a diagram describing a function of the connection pipe for an evaporator of a refrigeration device according to the comparative example.

FIG. 1 is a diagram describing a manufacturing method of a connection pipe according to a comparative example. FIGS. 2 and 3 are diagrams describing a connection pipe and a manufacturing method of the connection pipe according to a comparative example. FIG. 4 is a diagram describing a function of the connection pipe according to the comparative example.

A first step S1 includes multi-bending a first pipe 10. The multi-bending is described in more detail below. The straight first pipe 10 is bent or angled to have first and second curvature portions 12 and 14, as illustrated in FIG. 2.

The first pipe 10 may be made of aluminum. As a result, the first pipe 10 may have flexibility and in particular, may be easily welded to an accumulator.

Meanwhile, a curvature radius of the first curvature portion 12 and a curvature radius of the second curvature portion 14 may be different from each other. A first curvature angle a of the first curvature portion 12 according to the comparative example may be larger than 180° and a second curvature angle b of the second curvature portion 13 according to the comparative example may be larger than 100° and smaller than 180°.

A second step S2 includes connecting the first pipe 10 and the second pipe 20. As illustrated in FIG. 3, a first end 16 of the first pipe 10 and a first end 22 of the second pipe 20 are inserted into a tube 30, and the tube 30 is subjected to high-frequency welding. While the welding is performed, a thermal contraction phenomenon may occur, and as a result, the first pipe 10 and the second pipe 20 are physically connected to each other.

The second pipe 20 may be made of copper. As a result, the second pipe 20 may have high rigidity.

A third step S3 includes connecting the connection pipe to the accumulator 60. In more detail, as illustrated in FIG. 4, the first pipe 10 of the connection pipe is connected to the accumulator 60. The evaporator 50 is outside of a wall 400 of the refrigeration device and the accumulator 60 is connected to the evaporator 50. The first pipe 10 and the accumulator 60 are connected to each other by welding, and as a result, a welding portion 62 is formed at a connector of the accumulator 60.

A fourth step S4 includes connecting the connection pipe with a suction pipe 70. In more detail, as illustrated in FIG. 4, the second pipe 20 of the connection pipe is connected to the suction pipe 70.

When the suction pipe 70 is connected to the connection pipe, the suction pipe 70 is pressed in the direction indicated by the arrow P, as illustrated in FIG. 4. The force P (e.g., pressure) may be applied to the first pipe 10, and the first pipe 10 may elastically deformed by the force P. However, a direction of the pressed force may be concentrated on the second curvature portion 14. Therefore, the second curvature portion 14 may be inappropriately bent, damaged, or deformed. In particular, since aluminum is lower in rigidity than copper, the first pipe 10 may be deformed or damaged in a particular location of relatively high stress and/or strain.

Meanwhile, the working space is relatively small and/or narrow in parts of the refrigeration device where the evaporator 50 is installed, causing inconvenience to the installer during installation. It is difficult to manipulate and connect the connection pipe to the suction pipe 70. Thus, additional attention and longer installation time are required, decreasing productivity. The first pipe 10 may also be damaged at an unacceptably high rate.

As described above, when the connection pipe is partially bent, or abnormally deformed, the circulation of refrigerant is adversely affected. During the circulation of the refrigerant in the refrigeration cycle, the size of the inner diameter in the connection pipe may change, adversely affecting the temperature of the refrigerant, and the cooling effect of the refrigeration device may decrease.

Hereinafter, a connection pipe and methods of manufacturing and/or using the connection pipe for an evaporator of a refrigeration device (e.g., refrigerator) according to exemplary embodiments of the present disclosure will be described with reference to FIGS. 5 to 8.

Figure 5:
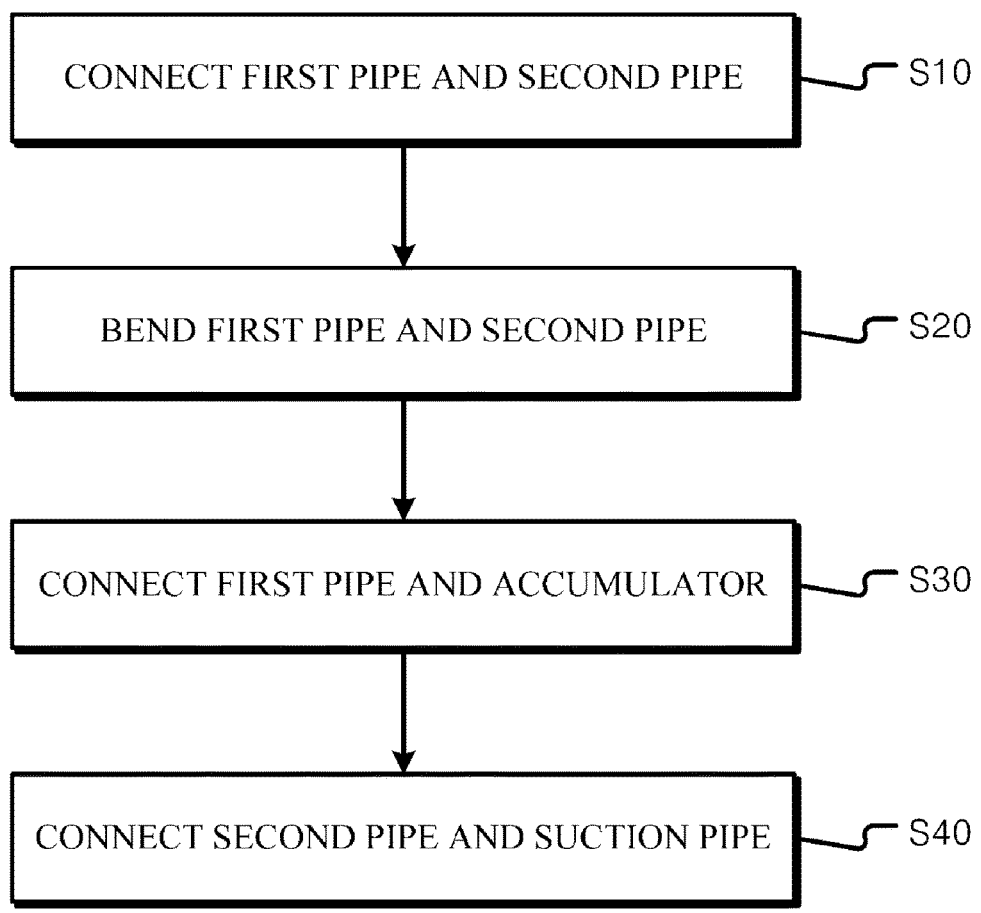
FIG. 5 is a diagram describing a manufacturing method of a connection pipe for an evaporator of a refrigeration device according to exemplary embodiments of the present disclosure.
Figure 6:
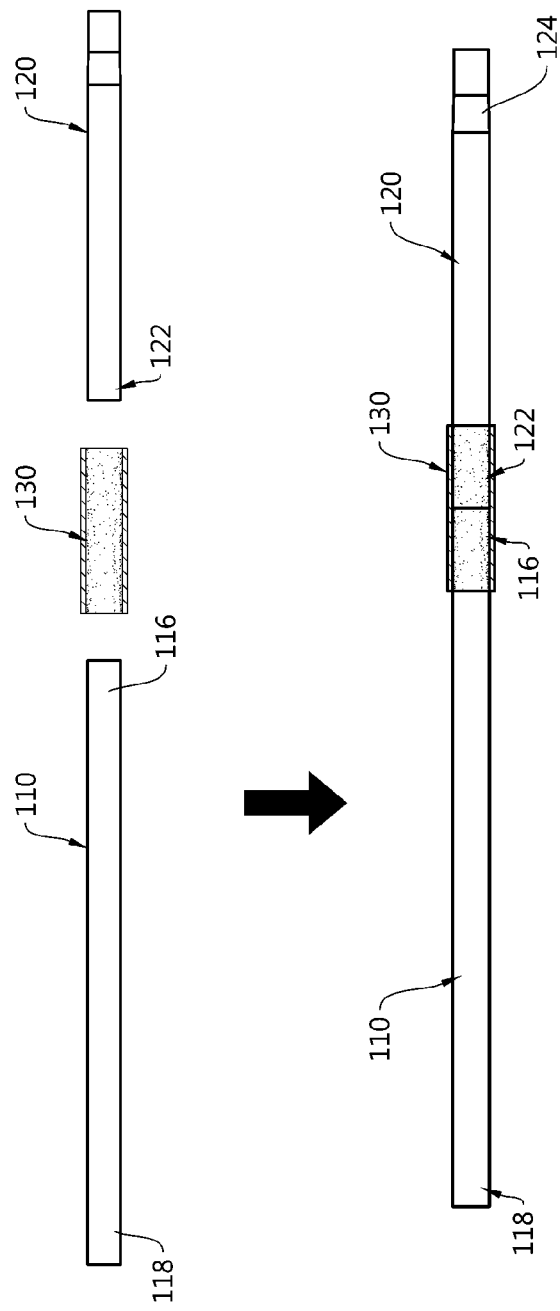
FIGS. 6 and 7 are diagrams describing a connection pipe and a manufacturing method of the connection pipe for an evaporator of a refrigeration device according to exemplary embodiments of the present disclosure.
Figure 7:
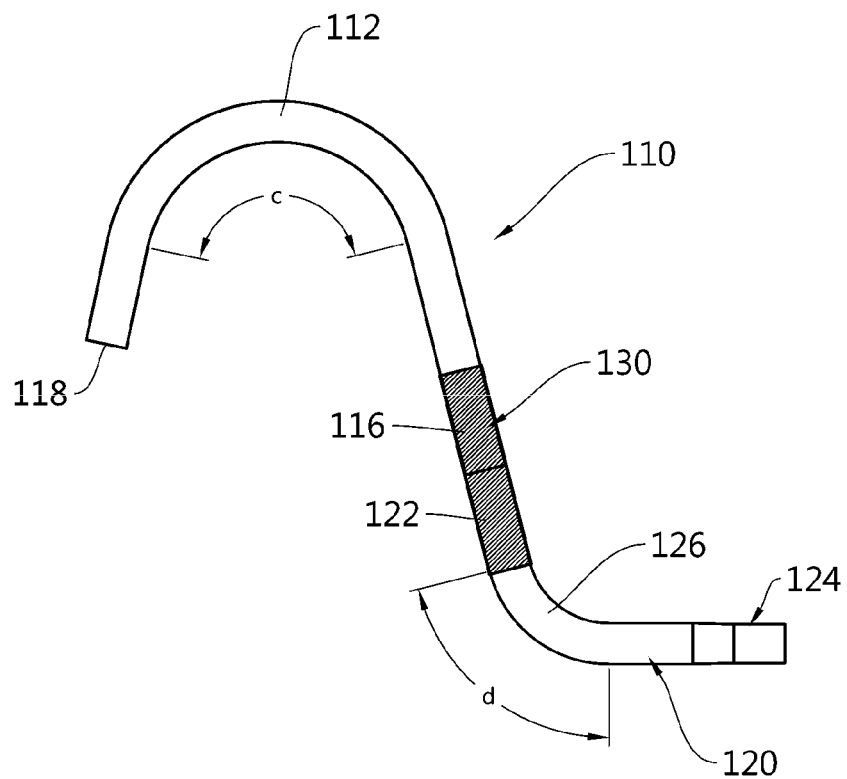
Figure 8:
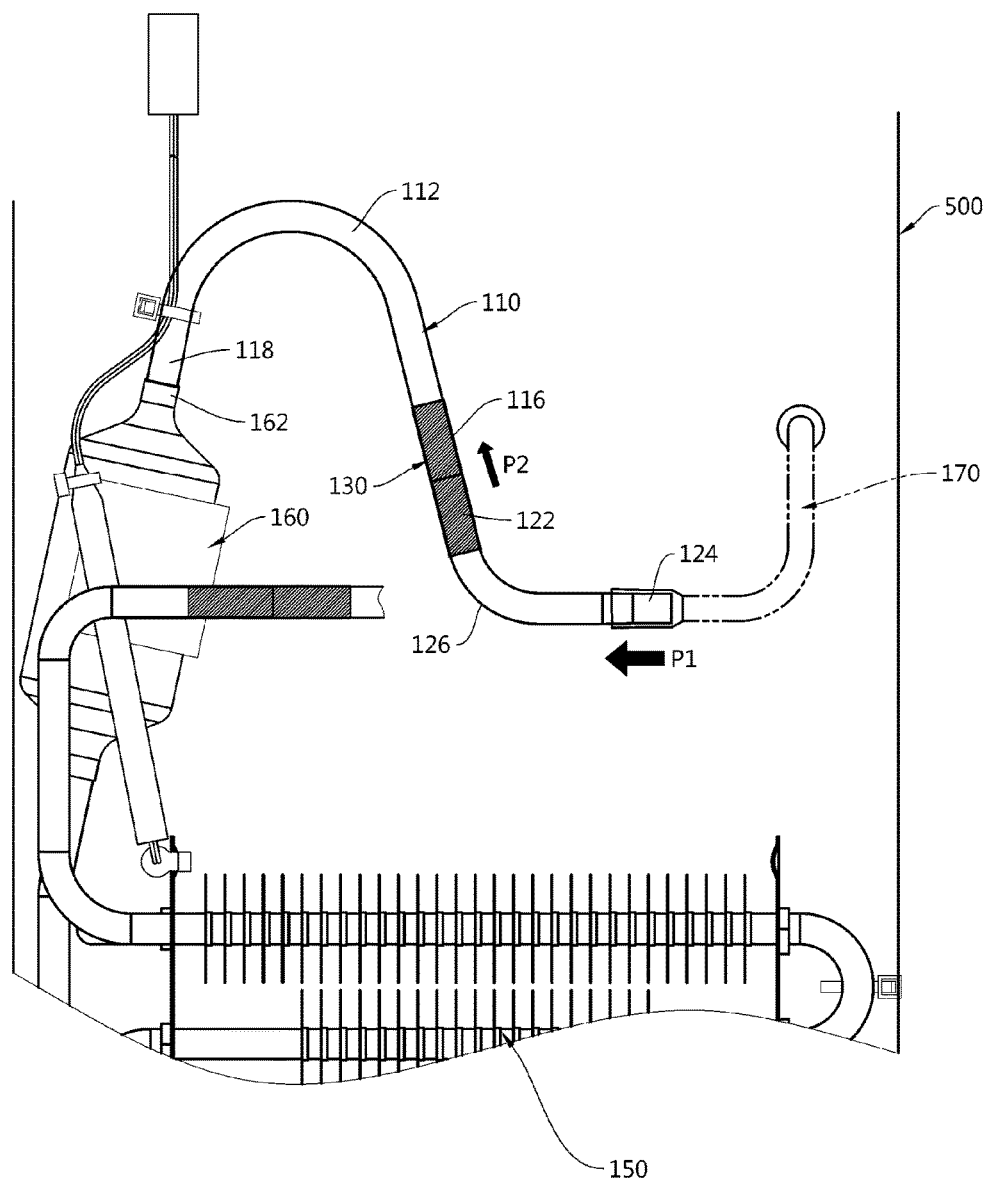
FIG. 8 is a diagram describing an exemplary function of the connection pipe for an evaporator of a refrigeration device according to the exemplary embodiments of the present disclosure.

FIG. 5 is a diagram describing methods of manufacturing and/or using a connection pipe for an evaporator of a refrigeration device according to exemplary embodiments of the present disclosure. FIGS. 6 and 7 are diagrams describing a connection pipe and a manufacturing method of the connection pipe for an evaporator of a refrigeration device according to exemplary embodiments of the present disclosure. FIG. 8 is a diagram describing a function of the connection pipe for an evaporator of a refrigeration device according to exemplary embodiments of the present disclosure.

A first step S'10 includes connecting a first pipe 110 and a second pipe 120 (e.g., to each other). As illustrated in FIG. 6, a first end 116 of the first pipe 110 (which may be straight), and a first end 122 of the second pipe 120 (which may also be straight), are inserted into a tube 130, and the tube 130 is subjected to high-frequency welding. While the welding is performed, a thermal contraction phenomenon may occur. Alternatively, the first pipe 110 and the second pipe 120 may be welded directly to each other, or the first pipe 110 and the second pipe 120 may be adhered to a sleeve similar to tube 130, using glue or an adhesive. As a result, the first pipe 110 and the second pipe 120 are physically connected to each other.

The length of the first pipe 110 according to exemplary embodiments of the present disclosure may be shorter than that of the first pipe 10 according to the comparative example. The length of the first pipe 110 must be sufficient to form the first curvature portion 112.

The length of the second pipe 120 according to exemplary embodiments of the present disclosure may be longer than that of the second pipe 20 according to the comparative example. The length of the second pipe 120 must be sufficient to form the second curvature portion 126.

A second step S'20 includes bending the connection pipe, preferably at least two times. According to exemplary embodiments of the present disclosure, the straight first pipe 110 is bent to form the first curvature portion 112, and the straight second pipe 120 is bent or angled to form the second curvature portion 126, as illustrated in FIG. 7.

The connection pipe according to exemplary embodiments of the present disclosure has the first curvature portion 112 and the second curvature portion 126 at opposite sides or ends of the tube 130. In more detail, at least one first curvature portion 112 may be formed, and at least one second curvature portion 126 may also be formed. Bending directions of the first curvature portion 112 and the second curvature portion 126 may also be opposite of each other. As a result, an overall exterior shape of the connection pipe is a zigzag, angled, or curved shape.

Meanwhile, a curvature radius of the first curvature portion 112 and a curvature radius of the second curvature portion 126 may be different from each other. The first curvature angle c of the first curvature portion 112 according to exemplary embodiments of the present disclosure may be larger than 90° and smaller than 180°. For example, 120°-170°, 135°-160°, or any value or range of values greater than 90° and greater than 180°. The second curvature angle d of the second curvature portion 126 according to exemplary embodiments of the present disclosure may be smaller than 90°. For example, 45-80°, 60-75°, any value or range of values of at least 30° and less than 90°. The first end 116 and the second end 118 of the first pipe 110 form an acute angle. A first end 122 and a second end 124 of the second pipe 120 form an obtuse angle.

A third step S30 includes connecting the connection pipe with an accumulator 160. In more detail, as illustrated in FIG. 8, the first pipe 110 of the connection pipe according to exemplary embodiments of the present disclosure is connected to the accumulator 160. An evaporator 150 is at one side (e.g., an outside) of a wall 500 of the refrigeration device and the accumulator 160 is connected to the evaporator 150. The first pipe 110 and the accumulator 160 are connected to each other by welding, and as a result, a welding portion 162 may be formed at a connector of the accumulator 160.

A fourth step S40 in FIG. 5 includes connecting the connection pipe to the suction pipe 170. In more detail, as illustrated in FIG. 8, the suction pipe 170 is connected to the second end 124 of the second pipe 120 according to exemplary embodiments of the present disclosure.

When the suction pipe 170 is connected to the connection pipe, the suction pipe 170 is pressed in the direction indicated by the arrow P1, as illustrated in FIG. 8. The force or pressure P1 may act on the first pipe 110, and the first pipe 110 may be deformed by the force or pressure P1. However, the force P1 may be specifically applied, so that a larger amount of force P1 may be applied on the second curvature portion 126.

However, since the second pipe 120 may be copper, the second pipe 120 may be more rigid and secure through the first pipe 112. As a result, the second curvature portion 126 may not be arbitrarily or inappropriately bent, damaged, or deformed.

A force P2 (e.g., part of the force or pressure P1) may be distributed to the entire connection pipe via the tube 130 when the force P1 is applied in the direction indicated by the arrow P1 illustrated in FIG. 8, to the second pipe 120 due to a the configuration of the second pipe 120. The configuration refers to the curvature radius of the second curvature portion 126 that forms an angle or arc smaller than 90°, and as a result, the overall shape of the second pipe 120 forms an obtuse angle.

Therefore, since the working space is relatively small or narrow in parts of the refrigeration device at the location of the evaporator 150, the installer may be inconvenienced during installation. When the suction pipe 170 is connected to the connection pipe 110 according to exemplary embodiments of the present disclosure, the suction pipe 170 is inserted to the connection pipe with a relatively large amount of force P1 but less force than the force P applied to the conventional connection pipe 10, to securely connect the connection pipe and the suction pipe 170 to each other. The connection pipe may have sufficient rigidity to prevent the connection pipe from being deformed or damaged.

The assembling or installation may be performed without requiring excessive attention regarding the deformation of the connection pipe, and as a result, it may be possible to improve productivity.

As described above, the connection pipe is prevented from being partially bent or deformed, and as a result, the refrigerant is effectively circulated. During the circulation of the refrigerant, the size of an inner diameter of the connection pipe may not change, and as a result, the flow of the refrigerant is sufficiently maintained, and temperature of the refrigeration device is sufficiently maintained. Although the present connection pipe 110 having a smaller overall or total angle of curvature may generate about the same amount of noise as the connection pipe 10 when the refrigerant passes through, the cooling efficiency of the refrigerator containing the present connection pipe 110 is significantly greater than that of an otherwise identical refrigerator containing or using the conventional pipe 10. These results provided by the present invention are unexpected.

The refrigeration device may be devices that maintain a low-temperature state by using a refrigeration cycle, such as a refrigerator and a freezer.

Although exemplary embodiments of the present disclosure are described above with reference to the accompanying drawings, those skilled in the art will understand that the present disclosure may be implemented in various ways without changing the necessary features or the spirit of the present disclosure.

Therefore, it should be understood that the exemplary embodiments described above are not limiting, but only an example in all respects, the scope of the present disclosure is expressed by the claims below, not the detailed description, and all of the changes and modifications achieved from the meanings and scope of claims and equivalent concepts are included in the scope of the present disclosure.

From the foregoing, it will be appreciated that various embodiments of the present disclosure have been described herein for purposes of illustration, and that various modifications may be made without departing from the scope and spirit of the present disclosure. The exemplary embodiments disclosed in the specification of the present disclosure will not limit the present disclosure. The scope of the present disclosure will be interpreted by the claims below, and it will be construed that all techniques within the scope equivalent thereto belong to the scope of the present disclosure.

What is claimed is:

1. A method of a connection pipe for an evaporator of a refrigeration device, comprising:

inserting a first pipe having a first end and a second end and a second pipe having a third end and a fourth end into a tube to physically connect the first pipe and the second pipe, wherein the first pipe and the second pipe are substantially straight;

forming a first curvature portion in the first pipe and forming a second curvature portion in the second pipe; and coupling an end of the second pipe to a suction pipe, wherein the first and second curvature portions are formed after coupling the first pipe and the second pipe, wherein the first curvature portion has a first curvature angle wherein the first end and the second end of the first pipe are configured to form an acute angle, wherein the second curvature portion has a second curvature angle, wherein the third end and the fourth end of the second pipe are configured to form an obtuse angle, wherein the first curvature portion and the second curvature portion have curvature directions that are opposite to each other, and wherein the first pipe comprises aluminum and the second pipe comprises copper.

2. The method of claim 1, comprising a single first curvature portion and a single second curvature portion comprises at least one angled portion.

3. The method of claim 1, further comprising welding the first pipe and the second pipe, to the tube.

4. The method of claim 1, further comprising welding the first pipe to an accumulator.

5. The method of claim 4, wherein the first pipe is welded to the accumulator by high-frequency welding.

* * * * *